United States Patent
Eriguchi et al.

(10) Patent No.: US 12,555,336 B2
(45) Date of Patent: Feb. 17, 2026

(54) IMAGE PROCESSING APPARATUS AND IMAGE PROCESSING METHOD

(71) Applicant: SONY GROUP CORPORATION, Tokyo (JP)

(72) Inventors: Masao Eriguchi, Tokyo (JP); Ryo Oguchi, Tokyo (JP); Shin Takanashi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 190 days.

(21) Appl. No.: 18/551,071

(22) PCT Filed: Jan. 18, 2022

(86) PCT No.: PCT/JP2022/001675
§ 371 (c)(1),
(2) Date: Sep. 18, 2023

(87) PCT Pub. No.: WO2022/201783
PCT Pub. Date: Sep. 29, 2022

(65) Prior Publication Data
US 2024/0161429 A1    May 16, 2024

(30) Foreign Application Priority Data
Mar. 26, 2021   (JP) ................... 2021-052808

(51) Int. Cl.
*G06T 19/00*      (2011.01)
*G06V 20/56*      (2022.01)

(52) U.S. Cl.
CPC .......... *G06T 19/006* (2013.01); *G06V 20/56* (2022.01); *G06V 2201/07* (2022.01)

(58) Field of Classification Search
CPC .................................................. G06T 19/006
See application file for complete search history.

(56) References Cited

U.S. PATENT DOCUMENTS

2011/0043627 A1* 2/2011 Werling ................. G06T 17/05
                                                                348/143
2011/0281644 A1* 11/2011 Kawamoto ........... G06T 19/006
                                                                463/43
(Continued)

FOREIGN PATENT DOCUMENTS

JP       2017-151981 A    8/2017
JP       2017-204261 A    11/2017
(Continued)

OTHER PUBLICATIONS

Rao et al., AR-IVI—Implementation of In-Vehicle Augmented Reality, IEEE International Symposium on Mixed and Augmented Reality 2014 Science and Technology Proceedings, Sep. 2014 (Year: 2014).*

(Continued)

*Primary Examiner* — Charles Tseng
(74) *Attorney, Agent, or Firm* — CHIP LAW GROUP

(57) ABSTRACT

Provided is an image processing apparatus that includes an image generating section that generates, in reference to computer graphics (CG) data, a virtual space image corresponding to an imaging range of an imaging section on a real space. For example, a virtual imaging section is installed on a virtual space in a manner corresponding to the imaging section on the real space, and a CG object on the virtual space is imaged to generate a virtual space image. The image processing apparatus includes an image superimposing section that superimposes the virtual space image on a real space image obtained by the imaging section imaging an object on the real space, to obtain a display image.

11 Claims, 10 Drawing Sheets

(56) References Cited

U.S. PATENT DOCUMENTS

2016/0343166 A1* 11/2016 Inoko ................. G06T 15/00
2017/0240047 A1* 8/2017 Candelore ............ B60J 3/04

FOREIGN PATENT DOCUMENTS

JP     2020-162136 A    10/2020
JP     2021-040871 A     3/2021

OTHER PUBLICATIONS

English Translation of JP 2021040871, Mar. 18, 2021 (Year: 2021).*
International Search Report and Written Opinion of PCT Application No. PCT/JP2022/001675, issued on Mar. 29, 2022, 09 pages of ISRWO.

* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2022/001675 filed on Jan. 18, 2022, which claims priority benefit of Japanese Patent Application No. JP 2021-052808 filed in the Japan Patent Office on Mar. 26, 2021. Each of the above-referenced applications is hereby incorporated herein by reference in its entirety.

TECHNICAL FIELD

The present technology relates to an image processing apparatus and an image processing method, and in particular, to an image processing apparatus and an image processing method that superimpose a virtual space image on a real space image to obtain a display image.

BACKGROUND ART

Mixed reality (MR) has been known as a video technology in which the real world and virtual reality are merged together to realize space representation with reality and virtuality mixed. PTL 1 discloses a technology in which, in a wearable terminal with a camera and a display corresponding one to one with each other, the position or the direction of an object on a virtual space superimposed on a captured image is corrected according to the orientation of the terminal.

CITATION LIST

Patent Literature

[PTL 1]
Japanese Patent Laid-open No. 2020-162136

SUMMARY

Technical Problem

An object of the present technology is to superimpose, on a real space image, a suitable virtual space image to obtain a good display image.

Solution to Problem

A concept of the present technology lies in an image processing apparatus including an image generating section that generates, in reference to CG (Computer Graphics) data, a virtual space image corresponding to an imaging range of an imaging section on a real space, and an image superimposing section that superimposes the virtual space image on a real space image obtained by the imaging section imaging an object on the real space, to obtain a display image.

In the present technology, the image generating section generates, in reference to the CG data, the virtual space image corresponding to the imaging range of the imaging section on the real space. Further, the image superimposing section obtains the display image by superimposing the virtual space image on the real space image obtained by the imaging section imaging the object on the real space. The image processing apparatus may further include, for example, an imaging section on the real space. Furthermore, the image processing apparatus may further include, for example, a display section that displays an image based on the display image.

For example, the image generating section may install a virtual imaging section on the virtual space in a manner corresponding to the imaging section on the real space, and use the virtual imaging section to image a CG object on the virtual space and generate a virtual space image. This makes it possible to appropriately obtain a virtual space image that is suitable for the real space image obtained by the imaging section imaging the object on the real space.

In this case, for example, the image generating section may install the virtual imaging section on the virtual space according to a position, a direction, and an angle of view of the imaging section on the real space. This enables the virtual imaging section to easily be installed on the virtual space in a manner corresponding to the imaging section on the real space.

Further, in this case, for example, the imaging section on the real space may be attached to a vehicle, and the position and the direction of the imaging section on the real space may be decided in reference to information regarding a position and an orientation of the vehicle on the real space and an attachment position and an attachment angle of the imaging section on the vehicle. Thus, in a case where the imaging section on the real space is attached to the vehicle, the position and direction of the imaging section on the real space can be correctly decided.

Here, the image processing apparatus may further include, for example, a position estimating section that estimates the position of the vehicle on the real space. This enables information regarding the position of the vehicle on the real space to be obtained. Moreover, the image processing apparatus may further include, for example, an information storage section that stores information regarding a correspondence relation between the position and the orientation, the information being used to determine the orientation of the vehicle according to the estimated position of the vehicle on the real space. This enables the orientation of the vehicle to be determined according to the estimated position of the vehicle.

As described above, the present technology generates, in reference to the CG data, the virtual space image corresponding to the imaging range of the imaging section on the real space and superimposes the virtual space image on the real space image obtained by the imaging section imaging the object on the real space, to obtain the display image. Thus, a good display image can be obtained by superimposing, on the real space image, the virtual space image suitable for the real space image.

Note that, in the present technology, for example, the image generating section may change the CG data according to a change in an environment of the real space. This allows the virtual space image superimposed on the real space image to be changed according to a change in the environment, enabling a more effective display image to be obtained.

Further, in the present technology, for example, the image generating section may generate, in reference to identical CG data, multiple virtual space images respectively corresponding to the imaging ranges of multiple imaging sections on the real space, and the image superimposing section may superimpose, on multiple real space images obtained by the multiple imaging sections imaging an object on the real space, the respective corresponding virtual space images to obtain multiple display images.

Thus, multiple good display images can be obtained by superimposing, on multiple real space images, virtual space images suitable for the respective real space images. In this case, the multiple virtual space images are generated in reference to identical CG data, and on the multiple real space images, virtual space images that capture an identical virtual space (CG space) with the same viewpoints as those of the real space images can be superimposed.

In this case, for example, one processing section holding the CG data may constitute the image generating section and the image superimposing section. Further, in this case, for example, multiple processing sections may constitute the image generating section and the image superimposing section, and each of the processing sections may generate a virtual space image corresponding to the imaging range of the imaging section on the real space, in reference to the CG data held by the processing section or the CG data held by a common server, and superimpose the virtual space image on a real space image obtained by the imaging section imaging the object on the real space, to obtain a display image.

Further, in the present technology, for example, the imaging section on the real space is externally attached to the vehicle to capture a window image, and the display image may be displayed on a display section for display of the window image, the display section being disposed inside the vehicle. In this case, the display section can display the window image (the display image obtained by superimposing, on the real space image, the virtual space image suitable for the real space image) being changed according to a change in the position and the orientation of the vehicle.

Further, another concept of the present technology lies in an image processing method including a step of generating, in reference to CG (Computer Graphics) data, a virtual space image corresponding to an imaging range of an imaging section on a real space, and a step of superimposing the virtual space image on a real space image obtained by the imaging section imaging an object on the real space, to obtain a display image.

BRIEF DESCRIPTION OF DRAWINGS

FIGS. 3A and 3B depict diagrams schematically illustrating a real space and a virtual space corresponding to the real space, and the like.

DESCRIPTION OF EMBODIMENTS

Figure 1A:
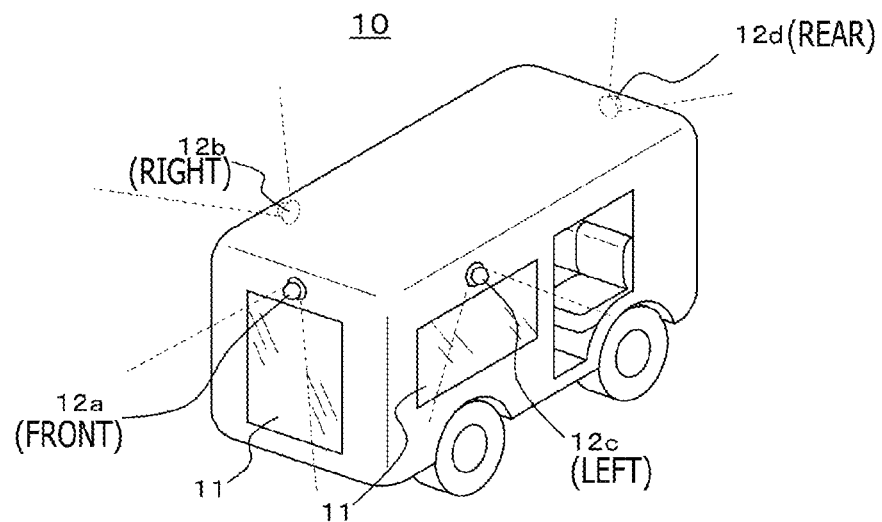
FIG. 1A and 1B depict diagrams illustrating an example of appearance of a vehicle to which the present technology is applied and an arrangement example of displays inside the vehicle.

Forms in which the invention is implemented (hereinafter referred to as "embodiments") will be described below. Note that the description will be given in the following order.
1. Embodiments
2. Variations 1. Embodiments FIG. 1A illustrates an example of appearance of a vehicle 10 in which an image processing apparatus according to the present technology is mounted. A vehicle 10 is a self-driving vehicle or a remote control vehicle and is provided with no window. The vehicle 10 is externally provided with a display section (display) 11. The display section 11 is provided to display an advertisement and the like.

Figure 1B:
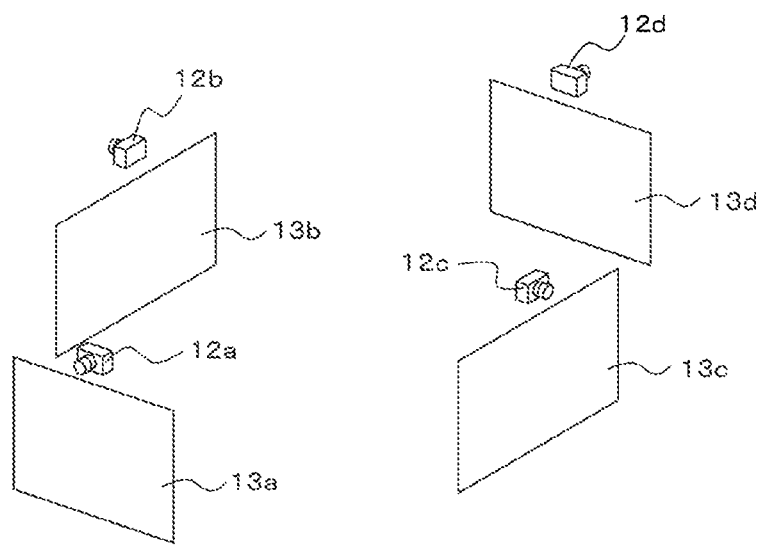

Further, cameras 12a, 12b, 12c, and 12d are respectively attached to an external front surface, an external right side surface, an external left side surface, and an external rear surface of the vehicle 10 as imaging sections for imaging the forward direction, the rightward direction, the leftward direction, and the rearward direction. Further, on an internal front surface, an internal right side surface, an internal left side surface, and an internal rear surface of the vehicle 10, displays 13a, 13b, 13c, and 13d are disposed at the respective positions of windows of a conventional vehicle as display sections for displaying window images, as illustrated in FIG. 1B.

In the present technology, each of the displays 13a, 13b, 13c, and 13d displays a display image obtained by superimposing a virtual space image on a real space image, as a window image. In this case, the display image displayed on each of the displays is obtained by superimposing, on a real space image obtained by the corresponding camera imaging an object on the real space, a virtual space image corresponding to the imaging range of the camera. Thus, on the real space image, the virtual space image suitable for the real space image is superimposed to obtain a display image, allowing provision of window images providing no feeling of strangeness to passengers.

As described below, for example, a PC (Personal Computer) executes image generating processing for generating a virtual space image and image superimposing processing for superimposing a virtual space image on a real space image.

Figure 2:
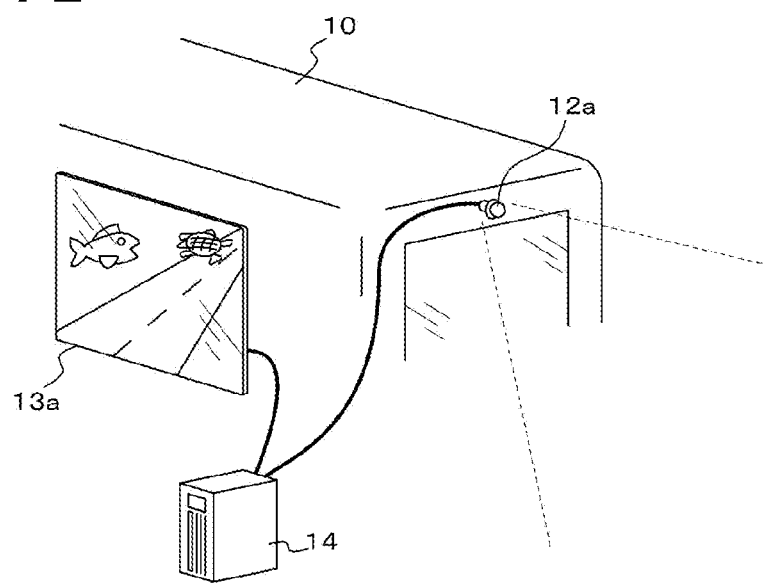
FIGS. 2 is a diagram illustrating an example of a relation between a camera attached to an external front surface of the vehicle, a display attached to an internal front surface of the vehicle, and a PC as a processing section.

FIG. 2 illustrates an example of a relation between the camera 12a attached to the external front surface of the vehicle 10, the display 13a provided on the internal front surface of the vehicle 10, and a PC 14 as a processing section.

The camera 12a images an object on the real space to obtain a real space image (image of a view in front of the vehicle), and transmits the real space image to the PC 14.

The PC 14 generates a virtual space image corresponding to the imaging range of the camera 12*a*, in reference to CG data. Further, the PC 14 superimposes the virtual space image on the real space image transmitted from the camera 12*a*, to generate a display image, and transmits the display image to the display 13*a*. The display 13*a* displays the display image. In the illustrated example, the display 13*a* displays a virtual space object (CG object) such as fish or a turtle together with a real space object such as a road.

The virtual space image included in the display image on each display is generated in reference to identical CG data. Thus, the displays 13*a*, 13*b*, 13*c*, and 13*d* display respective virtual space images capturing an identical virtual space (CG space) with the same viewpoints as those of the real space images, allowing passengers of the vehicle 10 to observe the identical virtual space from the respective displays with different viewpoints. For example, the CG data is changed according to a change in such environment as a location, time, or weather, for example. This allows the virtual space image superimposed on the real space image to be changed according to a change in the environment, enabling a more effective display image to be obtained.

Further, the virtual space image included in the display image on each display is generated by, for example, using a virtual camera (virtual imaging section) installed on the virtual space in a manner corresponding to the camera (imaging section) on the real space and imaging a CG object on the virtual space. In this case, the virtual camera is installed on the virtual space according to the position, the direction, and the angle of view of the camera on the real space. This enables the virtual camera to easily be installed on the virtual space in a manner corresponding to the camera on the real space.

Here, since the camera is attached to the vehicle 10, the position and the direction of the camera on the real space are decided in reference to information regarding the position and the orientation of the vehicle 10 on the real space and the attachment position and the attachment angle of the camera on the vehicle 10. Thus, in a case where the camera on the real space is attached to the vehicle 10, the position and direction of the camera on the real space can correctly be decided.

Figure 3A:
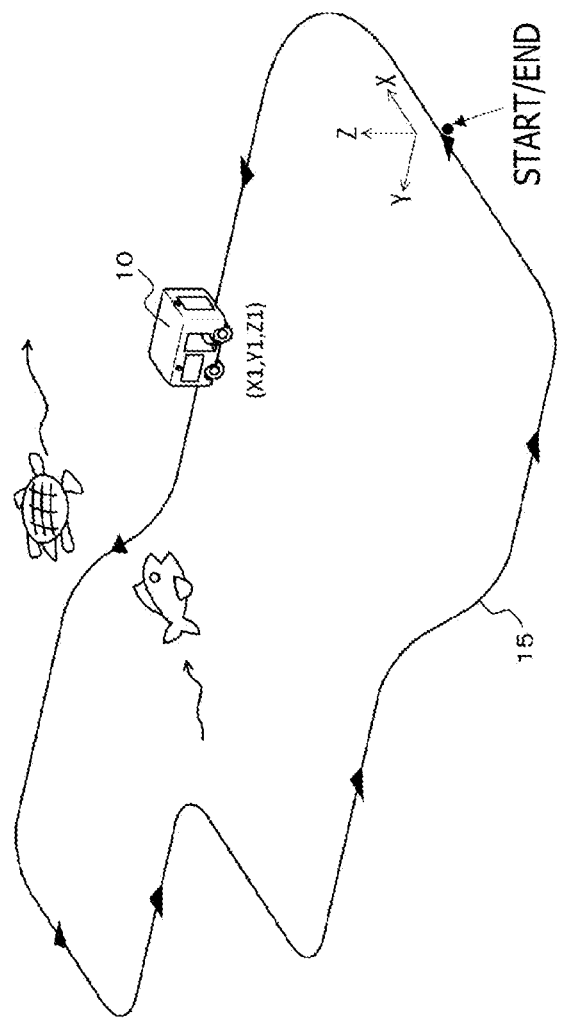

FIG. 3A schematically illustrates an example of a real space and a corresponding virtual space. Here, a coordinate system for these spaces is assumed to be an orthogonal coordinate system of X, Y, and Z. For example, the vehicle 10 travels along a course 15 from a start position to a goal position during a single traveling operation. The course 15 is a circling course, and hence, the start position and the goal position are the same.

The position of the vehicle 10 is represented by an X value, a Y value, and a Z value. Further, the orientation of the vehicle 10 (traveling direction, an inclination in a front-rear direction, and an inclination in a lateral direction) is represented by rotation with respect to the X axis, the Y axis, and the Z axis. The position of the vehicle 10 is estimated by, for example, a self position estimating section including the PC 14. The detailed description of the self position estimating section is omitted, but the self position estimating section uses a known self position estimating method to estimate the position of the vehicle 10.

Note that the vehicle 10 travels along the course 15 and thus, in a case where the PC 14 includes an information storage section that stores information regarding the correspondence relation between the length of time from the start and the position, the position of the vehicle 10 can be estimated in reference to the length of time from the start position.

Further, since the vehicle 10 travels along the course 15, the orientation of the vehicle 10 at each position is determined. Accordingly, for example, the PC 14 includes an information storage section that stores information regarding the correspondence relation between the position and the orientation, and can use the information regarding the correspondence relation between the position and the orientation to determine the orientation of the vehicle 10 according to the estimated position of the vehicle.

Figure 3B:
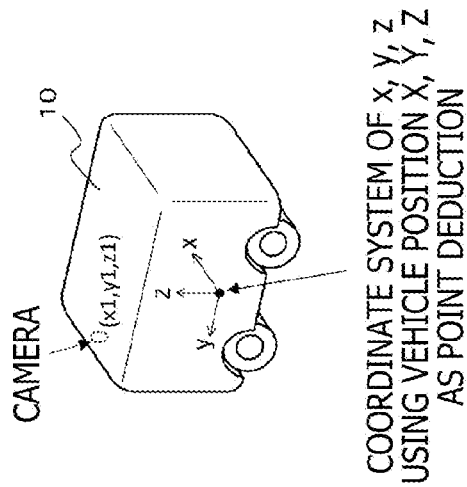

Further, the PC 14 includes an information storage section that stores information regarding the attachment position and the attachment angle (vertical angle and lateral angle) of the camera on the vehicle 10 and information regarding the angle of view of the camera. In the vehicle 10, the attachment position and the attachment angle of the camera attached to the vehicle 10 are set in the coordinate system of x, y, and z using a position X1, Y1, Z1 of the vehicle 10 as an origin, as illustrated in FIG. 3B. In the illustrated example, the attachment position of the camera is the position x1, y1, z1.

Figure 4:
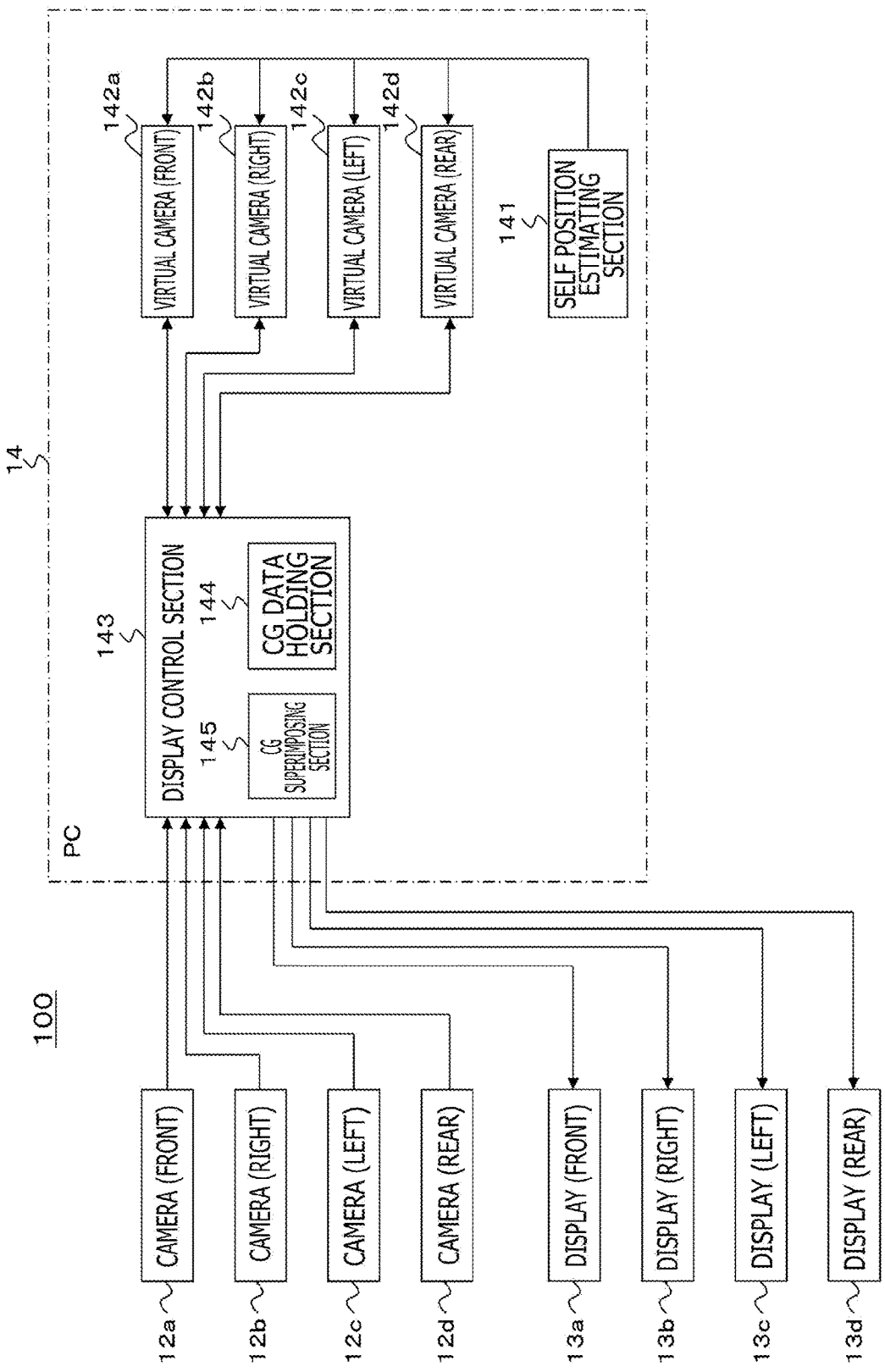
FIG. 4 is a block diagram illustrating a configuration example of an image processing apparatus mounted in the vehicle.

FIG. 4 illustrates a configuration example of an image processing apparatus 100 mounted in the vehicle 10. The image processing apparatus 100 includes the cameras 12*a*, 12*b*, 12*c*, and 12*d* attached respectively to the external front surface, the external right side surface, the external left side surface, and the external rear surface of the vehicle 10, the display sections 13*a*, 13*b*, 13*c*, and 13*d* respectively disposed on the internal front surface, the internal right side surface, the internal left side surface, and the internal rear surface of the vehicle 10, and the PC 14 as the processing section.

Further, the PC 14 includes a self position estimating section 141, virtual cameras 142*a*, 142*b*, 142*c*, and 142*d* installed on the virtual space in a manner corresponding to the respective cameras 12*a*, 12*b*, 12*c*, and 12*d* on the real space, and a display control section 143. The display control section 143 includes a CG data holding section 144 and a CG superimposing section 145.

The self position estimating section 141 estimates the position of the vehicle 10. For example, the self position estimating section 141 uses the information regarding the correspondence relation between the length of time from the start and the position for the vehicle 10 stored in the unillustrated information storage section provided in the PC 14, to estimate the position of the vehicle 10 in reference to the length of time from the start for the vehicle 10.

The virtual cameras 142*a*, 142*b*, 142*c*, and 142*d* are respectively installed on the virtual space in a manner corresponding to the positions, the directions, and the angles of the cameras 12*a*, 12*b*, 12*c*, and 12*d* on the real space determined from the position of the vehicle 10 estimated by the self position estimating section 141, and the like.

In this case, the positions and the directions of the cameras 12*a*, 12*b*, 12*c*, and 12*d* on the real space are respectively decided in reference to the information regarding the position and the orientation of the vehicle 10 on the real space and the attachment positions and the attachment angles of the cameras 12*a*, 12*b*, 12*c*, and 12*d* on the vehicle 10.

Here, the orientation of the vehicle 10 on the real space is determined, for example, according to the position of the vehicle 10 estimated by the self position estimating section 141, with use of the information regarding the correspondence relation between the position and the orientation stored in the unillustrated information storage section provided in the PC 14. Further, the attachment positions and the attachment angles of the cameras 12a, 12b, 12c, and 12d on the vehicle 10 and further the angles of view of the cameras 12a, 12b, 12c, and 12d are acquired from the unillustrated information storage section provided in the PC 14.

The virtual cameras 142a, 142b, 142c, and 142d generate virtual space images corresponding to the imaging ranges of the cameras 12a, 12b, 12c, and 12d, in reference to the CG data held by the CG data holding section 144 of the display control section 143. In this case, each of the virtual cameras 142a, 142b, 142c, and 142d images a CG object on the virtual space (CG space) to obtain virtual space images.

The real space images obtained by the cameras 12a, 12b, 12c, and 12d imaging an object on the real space are transmitted to the display control section 143 of the PC 14. The CG superimposing section 145 of the display control section 143 superimposes the virtual space images generated by the virtual cameras 142a, 142b, 142c, and 142d respectively on the real space images obtained by the cameras 12a, 12b, 12c, and 12d, to generate display images for the front surface, the right side surface, the left side surface, and the rear surface.

The display images for the front surface, the right side surface, the left side surface, and the rear surface generated by the display control section 143 are transmitted to and displayed on the respective displays 13a, 13b, 13c, and 13d. In this case, for example, the display 13a displays, as a window image, the display image for the front surface obtained by superimposing, on the real space image of a view in front of the vehicle 10 captured by the camera 12a, the virtual space image obtained by the virtual camera 142a imaging the virtual space (CG space) in a manner corresponding to the imaging range of the camera 12a. Detailed descriptions are omitted, but the other displays similarly display, as window images, the display images for the corresponding surfaces.

Figure 5:
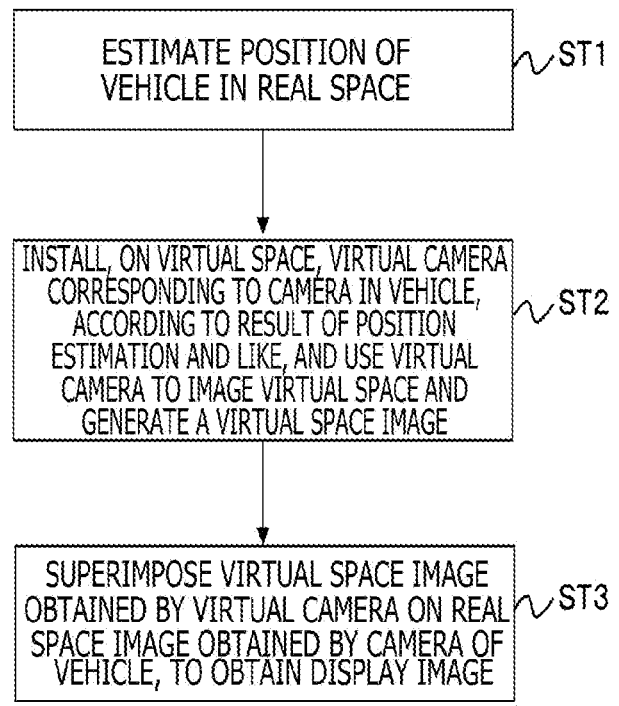
FIG. 5 is a flowchart illustrating an example of a procedure of processing for generating a display image, the processing being executed by a PC, for example, with a frame period.

A flowchart in FIG. 5 illustrates an example of the procedure of processing for generating a display image, the processing being executed by the PC 14, for example, with the frame period.

First, in step ST1, the PC 14 uses the self position estimating section 141 to estimate the position of the vehicle 10 on the real space. Next, in step ST2, the PC 14 installs, on the virtual space (CG space), the virtual camera corresponding to the camera in the vehicle 10, according to the result of position estimation and the like, and uses the virtual camera to image the virtual space and generate a virtual space image. Then, in step ST3, the PC 14 superimposes the virtual space image obtained by the virtual camera on the real space image obtained by the camera of the vehicle 10, to obtain a display image.

Figure 6:
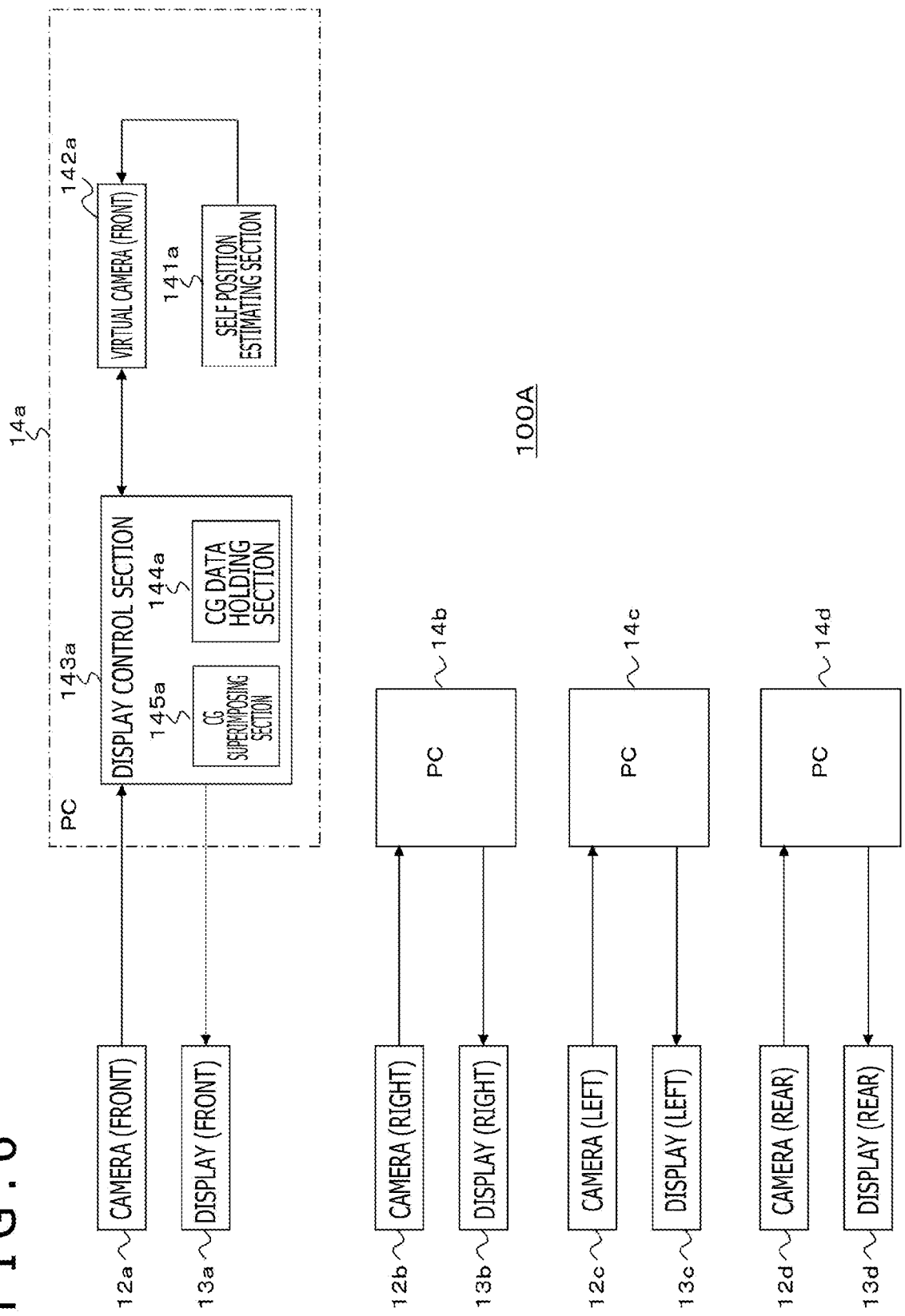
FIG. 6 is a block diagram illustrating another configuration example of the image processing apparatus mounted in the vehicle.

FIG. 6 illustrates a configuration example of an image processing apparatus 100A mounted in the vehicle 10. In FIG. 6, portions corresponding to those in FIG. 4 are denoted by identical signs, and detailed descriptions of these portions are omitted as appropriate.

The image processing apparatus 100A includes the cameras 12a, 12b, 12c, and 12d attached respectively to the external front surface, the external right side surface, the external left side surface, and the external rear surface of the vehicle 10, the display sections 13a, 13b, 13c, and 13d respectively disposed on the internal front surface, the internal right side surface, the internal left side surface, and the internal rear surface of the vehicle 10, and PCs 14a, 14b, 14c, and 14d as processing sections.

The PC 14a generates, in reference to the CG data, a virtual space image corresponding to the imaging range of the camera 12a, superimposes the virtual space image on a real space image (image of a view in front of the vehicle) obtained by the camera 12a imaging an object on the real space, to obtain a display image for the front surface, and transmits the display image to the display 13a.

The PC 14a includes a self position estimating section 141a, a virtual camera 142a installed on the virtual space in a manner corresponding to the camera 12a on the real space, and a display control section 143a. The display control section 143a includes a CG data holding section 144a and a CG superimposing section 145a.

Similarly to the self position estimating section 141 in the PC 14 of the image processing apparatus 100 in FIG. 4, the self position estimating section 141a estimates the position of the vehicle 10.

Similarly to the virtual camera 142a in the PC 14 of the image processing apparatus 100 in FIG. 4, the virtual camera 142a is installed on the virtual space according to the position, the direction, and the angle of the camera 12a on the real space that are determined from the position of the vehicle 10 estimated by the self position estimating section 141a, and the like.

The virtual camera 142a generates a virtual space image corresponding to the imaging range of the camera 12a, in reference to the CG data held by the CG data holding section 144a of the display control section 143a. In this case, the virtual camera 142a images a CG object on the virtual space (CG space) to obtain a virtual space image.

The real space image obtained by the camera 12a imaging the object on the real space is transmitted to the display control section 143a of the PC 14a. The CG superimposing section 145a of the display control section 143a superimposes the virtual space image generated by the virtual camera 142a on the real space image obtained by the camera 12a, to generate a display image for the front surface.

The display image for the front surface generated by the display control section 143a is transmitted to and displayed on the display 13a. In this case, the display 13a displays, as a window image, the display image for the front surface obtained by superimposing, on the real space image of a view in front of the vehicle 10 captured by the camera 12a, the virtual space image obtained by the virtual camera 142a imaging the virtual space (CG space) in a manner corresponding to the imaging range of the camera 12a.

Detailed descriptions of the PCs 14b, 14c, and 14d are omitted, but the PCs 14b, 14c, and 14d are configured in a manner similar to that of the PC 14a. The PCs 14b, 14c, and 14d generate, in reference to the CG data, virtual space images corresponding to the respective imaging ranges of the cameras 12b, 12c, and 12d, superimpose the virtual space images on real space images (images of a view on the right of the vehicle, a view on the left of the vehicle, and a view behind the vehicle) obtained by the cameras 12b, 12c, and 12d imaging an object on the real space, to obtain display images for the right side surface, the left side surface, and the rear surface, and transmit the display images to the displays 13b, 13c, and 13d. Thus, the displays 13b, 13c, and 13d respectively display, as window images, the display images for the right side surface, the left side surface, and the rear surface.

In this case, the pieces of CG data used in the PCs 14b, 14c, and 14d are identical to the CG data used in the PC 14a and are used with the time axis synchronized. Hence, even in a case where the virtual space involves motion, the passengers of the vehicle 10 can observe an identical virtual space from the displays 13a, 13b, 13c, and 13d with different viewpoints while having no feeling of strangeness.

Each of the PCs 14a, 14b, 14c, and 14d in the image processing apparatus 100A depicted in FIG. 6 generates a display image for one surface, allowing processing loads to be reduced compared to that in the PC 14 in the image processing apparatus 100 depicted in FIG. 4.

Figure 7:
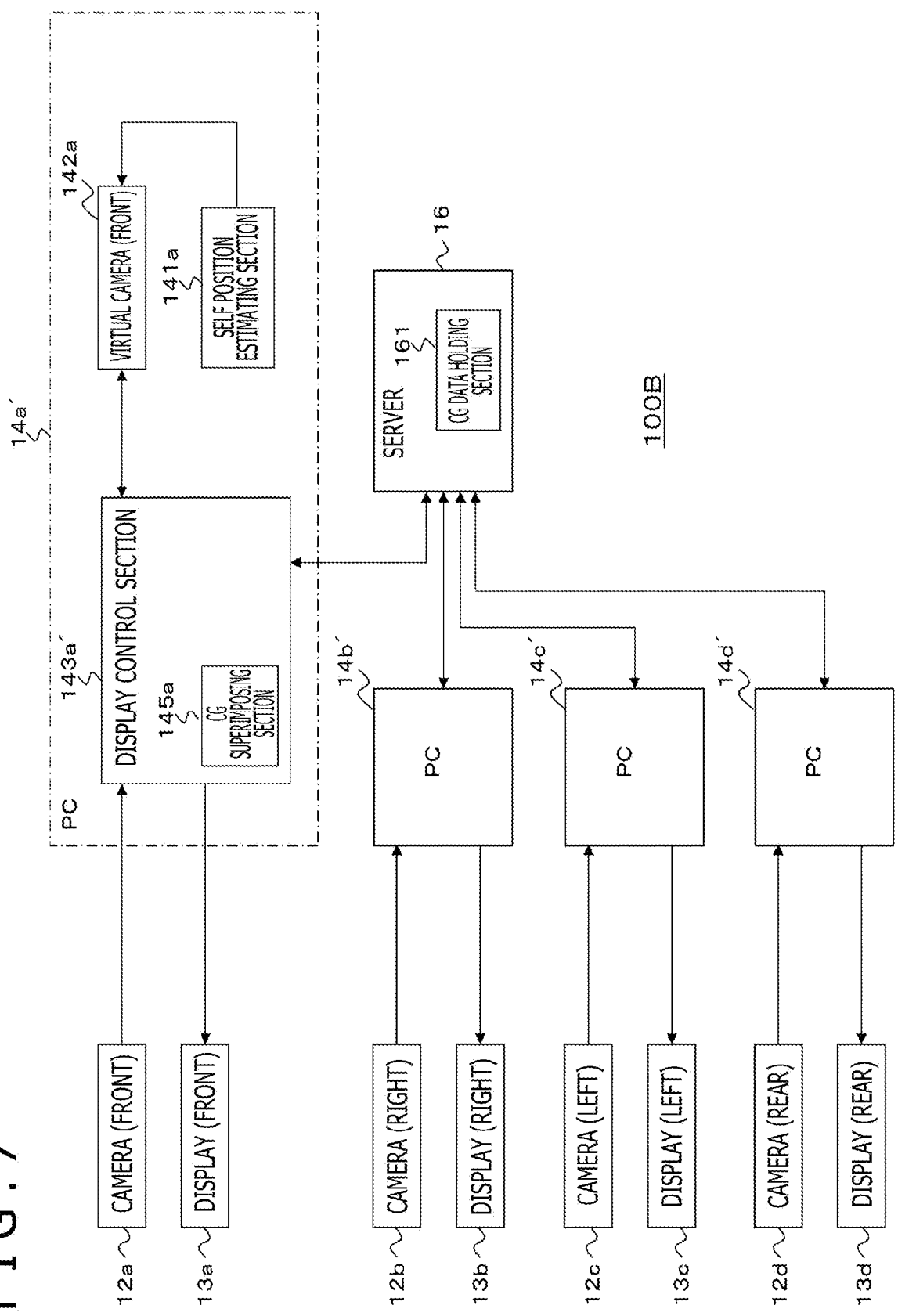
FIG. 7 is a block diagram illustrating another configuration example of the image processing apparatus mounted in the vehicle.

FIG. 7 illustrates a configuration example of an image processing apparatus 100B mounted in the vehicle 10. In FIG. 7, portions corresponding to those in FIGS. 4 and 6 are denoted by identical signs, and detailed descriptions of these portions are omitted as appropriate.

The image processing apparatus 100B includes the cameras 12a, 12b, 12c, and 12d respectively attached to the external front surface, the external right side surface, the external left side surface, and the external rear surface of the vehicle 10, the display sections 13a, 13b, 13c, and 13d respectively disposed on the internal front surface, the internal right side surface, the internal left side surface, and the internal rear surface of the vehicle 10, and PCs 14a´, 14b´, 14c´, and 14d´ as processing sections.

The PC 14a´ generates, in reference to the CG data, a virtual space image corresponding to the imaging range of the camera 12a, superimposes the virtual space image on a real space image (image of a view in front of the vehicle) obtained by the camera 12a imaging an object on the real space, to obtain a display image for the front surface, and transmits the display image to the display 13a.

The PC 14a´ includes a self position estimating section 141a, a virtual camera 142a installed on the virtual space in a manner corresponding to the camera 12a on the real space, and a display control section 143a´. The display control section 143a´ includes a CG superimposing section 145a.

Unlike the PC 14a in the image processing apparatus 100A in FIG. 6, the PC 14a´ holds no CG data in the display control section 143a´, and the virtual camera 142a, for example, uses CG data held by a CG data holding section 161 of a server 16 on a cloud, to generate a virtual space image.

The real space image obtained by the camera 12a imaging the object on the real space is transmitted to the display control section 143a´ of the PC 14a´. The CG superimposing section 145a of the display control section 143a´ superimposes the virtual space image generated by the virtual camera 142a on the real space image obtained by the camera 12a, to generate a display image for the front surface.

The display image for the front surface generated by the display control section 143a´ is transmitted to and displayed on the display 13a. In this case, the display 13a displays, as a window image, the display image for the front surface obtained by superimposing, on the real space image of a view in front of the vehicle 10 captured by the camera 12a, the virtual space image obtained by the virtual camera 142a imaging the virtual space (CG space) in a manner corresponding to the imaging range of the camera 12a.

Detailed description of the PCs 14b´, 14c´, and 14d´ are omitted, but the PCs 14b´, 14c´, and 14d´ are configured in a manner similar to that of the PC 14a´. The PCs 14b´, 14c´, and 14d´ generate, in reference to the CG data, virtual space images corresponding to the respective imaging ranges of the cameras 12b, 12c, and 12d, superimpose the virtual space images on real space images (images of a view on the right of the vehicle, a view on the left of the vehicle, and a view behind the vehicle) obtained by the cameras 12b, 12c, and 12d imaging an object on the real space, to obtain display images for the right side surface, the left side surface, and the rear surface, and transmit the display images to the displays 13b, 13c, and 13d. Thus, the displays 13b, 13c, and 13d respectively display, as window images, the display images for the right side surface, the left side surface, and the rear surface.

In the image processing apparatus 100B depicted in FIG. 7, the PCs 14a´, 14b´, 14c´, and 14d´ generate virtual space images by using the CG data held by the server 16. Compared to the PCs 14a, 14b, 14c, and 14d in the image processing apparatus 100A depicted in FIG. 6, the PCs 14a´, 14b´, 14c´, and 14d´ hold no CG data and thus allow memory capacity to be saved, eliminating the need to synchronize the time axis for the CG data among the PCs.

"Hardware Configuration Example of PC"

Figure 8:
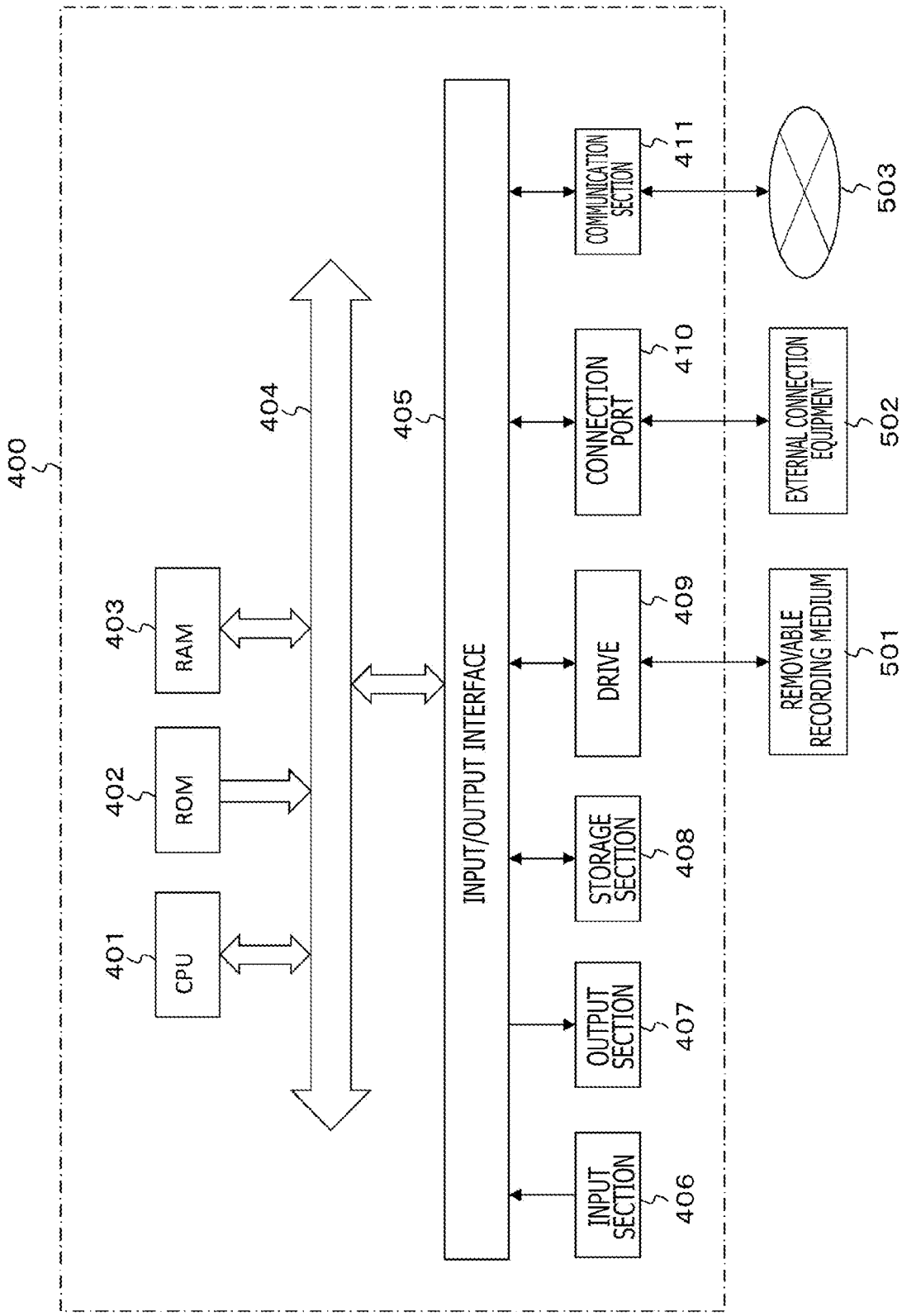
FIG. 8 is a block diagram illustrating a hardware configuration example of a computer.

FIG. 8 is a block diagram illustrating a hardware configuration example of a computer 400 (PCs 14, 14a to 14d, and 14a´ to 14d´;). The computer 400 includes a CPU 401, a ROM 402, a RAM 403, a bus 404, an input/output interface 405, an input section 406, an output section 407, a storage section 408, a drive 409, a connection port 410, and a communication section 411. Note that the hardware configuration depicted here is an example and that some of the components may be omitted. Moreover, the computer 400 may further include components other than those depicted here.

For example, the CPU 401 functions as an arithmetic processing apparatus or a control apparatus, and controls the operations of the components in general or some of the operations in accordance with various programs recorded in the ROM 402, the RAM 403, the storage section 408, or a removable recording medium 501.

The ROM 402 is means for storing programs loaded into the CPU 401, data used for calculation, and the like. For example, the RAM 403 temporarily or permanently stores programs loaded into the CPU 401, various parameters that vary as appropriate when the programs are executed, and the like.

The CPU 401, the ROM 402, and the RAM 403 are connected to one another via the bus 404. On the other hand, the bus 404 connects to various components via the interface 405.

The input section 406 used includes, for example, a mouse, a keyboard, a touch panel, buttons, switches, levers, and the like. Moreover, the input section 406 used may be a remote controller that can transmit control signals by using infrared light or any other radio wave.

The output section 407 is an apparatus that can visually or auditorily notify the user of information acquired, for example, a display apparatus such as a CRT (Cathode Ray Tube), an LCD, or an organic EL, an audio output apparatus such as a speaker or a headphone, a printer, a cellular phone, a facsimile machine, or the like.

The storage section 408 is an apparatus that stores various kinds of data. The storage section 408 used is, for example, a magnetic storage device such as a hard disk drive (HDD), a semiconductor storage device, an optical storage device, a magneto-optical storage device, or the like.

For example, the drive 409 is an apparatus that reads information recorded in the removable recording medium 501 such as a magnetic disk, an optical disc, a magneto-optical disc, or a semiconductor memory or writes information into the removable recording medium 501.

The removable recording medium 501 is, for example, a DVD medium, a Blu-ray (registered trademark) medium, an HD DVD medium, or any of semiconductor storage media. Needless to say, the removable recording medium 501 may be, for example, an IC card in which a non-contact IC chip is mounted, electronic equipment, or the like.

The connection port 410 is a port to which external connection equipment 502 is connected, for example, a USB (Universal Serial Bus) port, an IEEE 1394 port, a SCSI (Small Computer System Interface), an RS-232C port, an optical audio terminal, or the like. The external connection equipment 502 is, for example, a printer, a portable music player, a digital camera, a digital video camera, an IC recorder, or the like.

The communication section 411 is a communication device for connection to a network 503, for example, a wired or wireless LAN, Bluetooth (registered trademark), a communication card for WUSB (Wireless USB), a router for optical communication, a router for ADSL (Asymmetric Digital Subscriber Line), or a modem for various kinds of communication.

Note that the program executed by the computer may be a program that chronologically performs processing in the order described herein or a program that performs processing in parallel or at required timings such as when the program is invoked.

As described above, the image processing apparatuses 100, 100A, and 100B depicted in FIGS. 4, 6, and 7 generate, in reference to CG data, virtual space images corresponding to the imaging ranges of the cameras 12a to 12d on the real space, and superimpose the virtual space images on real space images obtained by the cameras 12a, 12b, 12c, and 12d imaging an object on the real space, to obtain display images. Thus, good display images can be obtained by superimposing, on real space images, virtual space images suitable for the real space images.

Further, the image processing apparatuses 100, 100A, and 100B depicted in FIGS. 4, 6, and 7 generate, in reference to identical CG data, multiple virtual space images corresponding to the imaging ranges of the four cameras 12a to 12d on the real space image, and superimpose, on real space images obtained by the four cameras 12a to 12d imaging an object on the real space, the respective corresponding virtual space images to obtain four window images for the front surface, the right side surface, the left side surface, and the rear surface.

In this case, the four virtual space images are generated in reference to the identical CG data, and on each of the four real space images, the corresponding virtual space image that captures the identical virtual space (CG space) with the same viewpoint as that of the real space image is superimposed. Consequently, the four displays 13a to 13d display the virtual space images superimposed on the real space images, the virtual space images capturing the identical virtual space (CG space) with the same viewpoints as those of the real space images, and the passengers of the vehicle 10 can observe the identical virtual space from the displays with different viewpoints.

2. Variations

Note that, in the examples provided in the above-described embodiments, the cameras 12a, 12b, 12c, and 12d are respectively attached to the external front surface, the external right side surface, the external left side surface, and the external rear surface of the vehicle 10, the displays 13a, 13b, 13c, and 13d are respectively disposed on the internal front surface, the internal right side surface, the internal left side surface, and the internal rear surface of the vehicle 10 as display sections for display of window images. However, the application of the present technology is not limited to the vehicle 10, and the present technology is also applicable to any other vehicle or moving apparatus.

Figure 9:
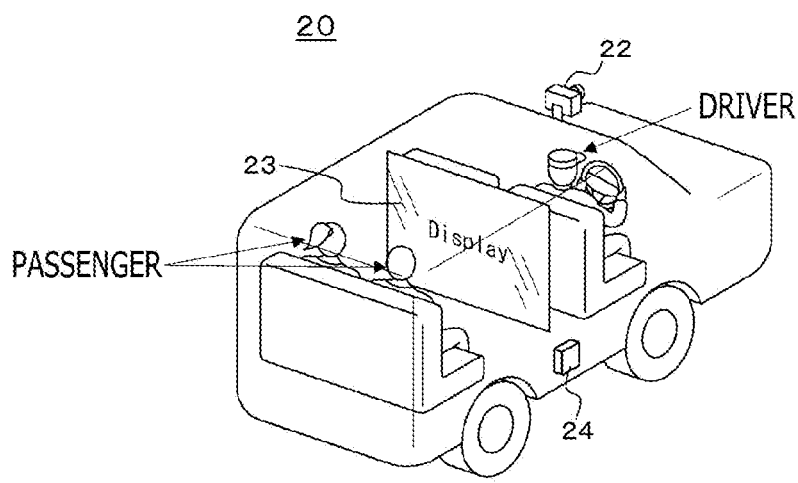
FIG. 9 illustrates a configuration example of a taxi to which the present technology is applied.

FIG. 9 illustrates a configuration example of a taxi 20 to which the present technology is applied. A camera 22 for imaging the real space is attached to an external front surface of the taxi 20, and a display 23 is disposed at a position between a driver in a front seat and a passenger in a rear seat inside the vehicle 10. Further, a PC 24 constituting the processing section is disposed inside the vehicle 10.

The camera 22 images an object on the real space to obtain a real space image (image of a view in front of the vehicle), and transmits the real space image to the PC 24. The PC 24 generates a virtual space image corresponding to the imaging range of the camera 22, in reference to CG data. Further, the PC 24 superimposes the virtual space image on the real space image transmitted from the camera 22, to generate a display image, and transmits the display image to the display 23. The display 23 displays an object (CG object) on the virtual space together with a real space object such as a road, and presents the objects to the passenger. Thus, the passenger can enjoy not only the real space image but also, for example, a virtual space image being changed according to a change in the location, time, environment, or the like.

Figure 10:
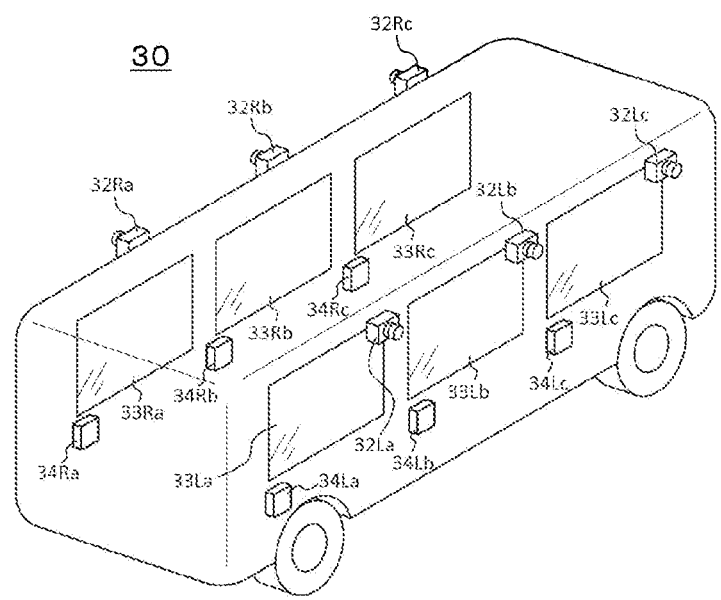
FIG. 10 illustrates a configuration example of a bus to which the present technology is applied.

FIG. 10 illustrates a configuration example of a bus 30 to which the present technology is applied. On an internal right side surface of the bus 30, displays 33Ra, 13Rb, and 13Rc are disposed at the positions of multiple windows, in this case, three windows, in a known bus. Further, cameras 23Ra, 23Rb, and 23Rc for imaging the real space, respectively corresponding to the displays 33Ra, 13Rb, and 13Rc, are attached to an external right surface of the bus 30.

Further, on an internal left side surface of the bus 30, displays 33La, 13Lb, and 13Lc are disposed at the positions of multiple windows, in this case, three windows, in a known bus. Further, cameras 32La, 32Lb, and 32Lc for imaging the real space, respectively corresponding to the displays 33La, 33Lb, and 33Lc, are attached to an external left surface of the bus 30.

Further, inside the bus 30, PCs 34Ra, 34Rb, 34Rc, 34La, 34Lb, and 34Lc constituting processing sections are disposed. The PC Ra constitutes a processing section corresponding to the camera 32Ra and the display 33Ra, and the camera 23Ra, the display 33Ra, and the PC 34Ra constitute one image processing apparatus. Also in each of the other portions, the camera, the display, and the PC constitute one image processing apparatus.

The portion of the image processing apparatus including the camera 32Ra, the display 33Ra, and the PC 34Ra will be described. The camera 32Ra images an object on the real space to obtain a real space image (image of a view on the right of the bus), and transmits the real space image to the PC 34Ra. The PC 34Ra generates, in reference to CG data, a virtual space image corresponding to the imaging range of the camera 32Ra. Further, the PC 34Ra superimposes the virtual space image on the real space image transmitted from the camera 32Ra, to generate a display image, and transmits the display image to the display 33Ra. The display 33Ra displays the display image as a window image, and presents the display image to the passenger.

Although detailed description is omitted, the portions of the other image processing apparatuses perform similar operations. The PC superimposes, on a real space image obtained by the camera through imaging, a corresponding virtual space image to generate a display image, and transmits the display image to the display as a window image to present the window image to the passengers.

Note that, in this case, the PC constituting each image processing apparatus uses the identical CG data and that the CG data held by each PC is used or the common CG data held by a server on the cloud is used among the PCs. In this case, in a case where the CG data held by each PC is used, the time axis needs to be synchronized during use. Further, instead of the configuration in which each image processing apparatus includes the PC, a configuration in which one PC with high processing capability executes all of the processing may be used.

Figure 11A:
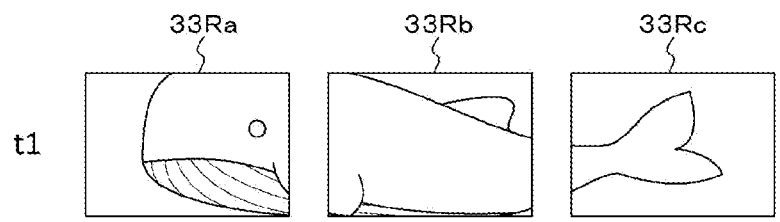
FIGS. 11A and 11B depict diagrams illustrating an example of a virtual space image displayed on three displays disposed on a right side surface of the bus at time point t1 and subsequent time point t2.
Figure 11B:
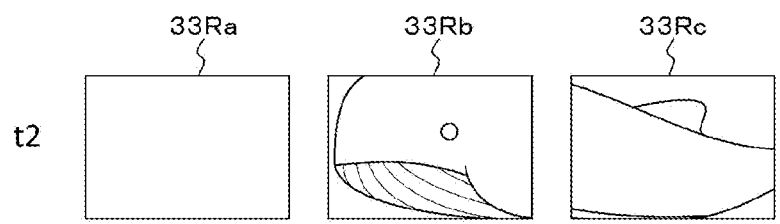

FIG. 11A illustrates an example of a virtual space image displayed at a time point t1 on the displays 33Ra, 33Rb, and 33Rc disposed on the internal right side surface of the bus 30. Further, FIG. 11B illustrates an example of a virtual space image displayed on the displays 33Ra, 33Rb, and 33Rc at a time point t2 subsequent to the time point t1. In this case, a CG object in the virtual space, here, a whale, results from a change in the manner of appearing on the displays 33Ra, 33Rb, and 33Rc according to a change in the positional relation between the bus 30 and the CG object.

Figure 12:
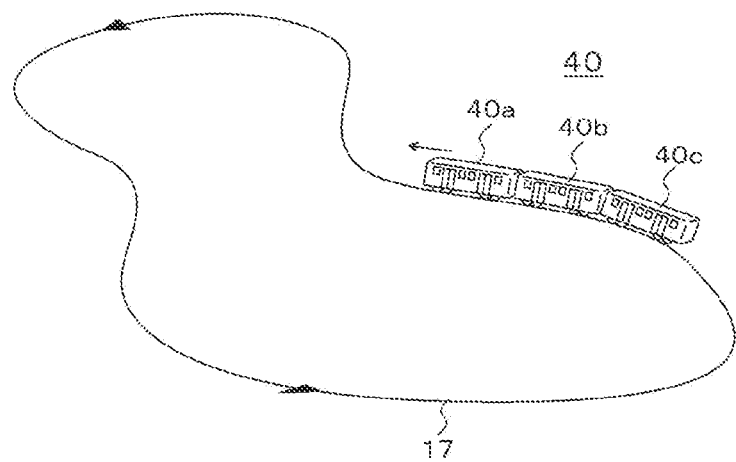
FIG. 12 is a diagram depicting a train to which the present technology is applied.

FIG. 12 depicts a train 40 which is traveling along a railroad 17 and to which the present technology is applied. Detailed description of each of a predetermined number of vehicles, here, three vehicles 40a, 40b, and 40c, constituting the train, is omitted, but the vehicles 40a, 40b, and 40c are assumed to have a configuration similar to that of the bus 30 depicted in FIG. 10. Hence, in each of the vehicles 40a, 40b, and 40c, the passengers can observe, as a window image, on displays disposed on window portions, a display image obtained by superimposing, on a real space image, a virtual space image generated using an identical CG image.

Further, in the examples provided in the above-described embodiments, the display displays a display image obtained by superimposing a virtual space image generated by the PC on a real space image captured by the camera. In a case where the display is disposed at the window position of the vehicle, for example, the display may be a transmissive display to display only a virtual space image.

Further, the preferred embodiments of the present disclosure have been described in detail with reference to the accompanied drawings, but the technical scope of the present disclosure is not limited to such examples. Obviously, those who have ordinary knowledge in the technical field of the present disclosure can arrive at variations or modifications within the scope of technical concepts set forth in claims, and it is comprehended that the variations and modifications reasonably belong to the technical scope of the present disclosure.

Further, the effects disclosed herein are only descriptive or illustrative and not restrictive. In other words, in addition to or instead of the effects described above, the technology according to the present disclosure can produce other effects that are clear to those skilled in the art from the descriptions herein.

Furthermore, the present technology can also take the following configurations.

(1)

An image processing apparatus including:

an image generating section that generates, in reference to CG (Computer Graphics) data, a virtual space image corresponding to an imaging range of an imaging section on a real space; and an image superimposing section that superimposes the virtual space image on a real space image obtained by the imaging section imaging an object on the real space, to obtain a display image.

(2)

The image processing apparatus according to (1) above, in which the image generating section installs a virtual imaging section on the virtual space in a manner corresponding to the imaging section on the real space, and uses the virtual imaging section to image a CG (Computer Graphics) object on the virtual space and generate a virtual space image.

(3)

The image processing apparatus according to (2) above, in which the image generating section installs the virtual imaging section on the virtual space according to a position, a direction, and an angle of view of the imaging section on the real space.

(4)

The image processing apparatus according to (3) above, in which the imaging section on the real space is attached to a vehicle, and the position and the direction of the imaging section on the real space is decided in reference to information regarding a position and an orientation of the vehicle on the real space and an attachment position and an attachment angle of the imaging section on the vehicle.

(5)

The image processing apparatus according to (4) above, further including:

a position estimating section that estimates the position of the vehicle on the real space.

(6)

The image processing apparatus according to (5) above, further including:

an information storage section that stores information regarding a correspondence relation between the position and the orientation, the information being used to determine the orientation of the vehicle according to the estimated position of the vehicle on the real space.

(7)

The image processing apparatus according to any one of (1) through (6) above, further including:

an imaging section on the real space.

(8)

The image processing apparatus according to (1) through (7) above, further including:

a display section that displays an image based on the display image.

(9)

The image processing apparatus according to claim 1 of any one of (1) through (8) above, in which the image generating section changes the CG (Computer Graphics) data according to a change in an environment of the real space.

(10)

The image processing apparatus according to any one of (1) through (9) above, in which the image generating section generates, in reference to identical CG (Computer Graphics) data, multiple virtual space images respectively corresponding to the imaging ranges of multiple imaging sections on the real space, and the image superimposing section superimposes, on multiple real space images obtained by the multiple imaging sections imaging an object on the real space, the respective corresponding virtual space images to obtain multiple display images.

(11)

The image processing apparatus according to (10) above, in which one processing section holding the CG (Computer Graphics) data constitutes the image generating section and the image superimposing section.

(12)

The image processing apparatus according to (10) above, in which multiple processing sections constitute the image generating section and the image superimposing section, and each of the processing sections generates a virtual space image corresponding to the imaging range of the imaging section on the real space in reference to the CG (Computer Graphics) data held by the processing section or the CG (Computer Graphics) data held by a common server, and superimposes the virtual space image on a real space image obtained by the imaging section imaging the object on the real space, to obtain a display image.

(13)

The image processing apparatus according to any one of (1) through (12) above, in which the imaging section on the real space is externally attached to the vehicle to capture a window image, and the display image is displayed on a display section for display of the window image, the display section being disposed inside the vehicle.

(14)

An image processing method including:

a step of generating, in reference to CG (Computer Graphics) data, a virtual space image corresponding to an imaging range of an imaging section on a real space; and a step of superimposing the virtual space image on a real space image obtained by the imaging section imaging an object on the real space, to obtain a display image.

REFERENCE SIGNS LIST

10: Vehicle
11: Display
12a to 12d: Camera
13a to 13d: Display
14, 14a to 14d, 14a´ to 14d´: PC
15: Course
16: Server
17: Railroad
20: Taxi
22: Camera
23: Display
24: PC
30: Bus
32Ra to 32Rd, 32La to 32Ld: Camera
33Ra to 33Rd, 33La to 33Ld: Display
34Ra to 34Rd, 34La to 34Ld: PC
40: Train
40a to 40c: Vehicle
100, 100A, 100B: Image processing apparatus
141, 141a: Self position estimating section
142a to 142d: Virtual camera
143, 143a´: Display control section
144, 144a: CG data holding section
145, 145a: CG superimposing section
161: CG data holding section

The invention claimed is:

1. An image processing apparatus, comprising:
at least one processor configured to:
acquire a real space image from a real camera, wherein
the real camera is attached to a vehicle in a real space, and
the real camera captures a real object on the real space to generate the real space image;
determine each of a position of the real camera on the real space and a direction of the real camera on the real space based on information associated with each of a position of the vehicle on the real space, an orientation of the vehicle on the real space, an attachment position of the real camera on the vehicle, and an attachment angle of the real camera on the vehicle;
install a virtual camera on a virtual space based on each of the position of the real camera on the real space, the direction of the real camera on the real space, and an angle of view of the real camera on the real space, wherein
the virtual camera corresponds to the real camera on the real space;
image, by the installed virtual camera, a computer graphics (CG) object on the virtual space;
generate, based on the imaged CG object and CG data associated with the imaged CG object, a virtual space image corresponding to an imaging range of the real camera;
superimpose the virtual space image on the real space image; and
generate a display image based on the superimposition of the virtual space image on the real space image.

2. The image processing apparatus according to claim 1, wherein the at least one processor is further configured to determine the position of the vehicle on the real space.

3. The image processing apparatus according to claim 2, further comprising a memory configured to store information regarding a correspondence relation between the position of the vehicle and the orientation of the vehicle,
wherein the at least one processor is further configured to determine, based on the information regarding the correspondence relation, the orientation of the vehicle with respect to the determined position of the vehicle on the real space.

4. The image processing apparatus according to claim 1, further comprising the real camera.

5. The image processing apparatus according to claim 1, further comprising a display device configured to display the display image.

6. The image processing apparatus according to claim 1, wherein the at least one processor is further configured to change the CG data based on a change in an environment of the real space.

7. The image processing apparatus according to claim 1, wherein the at least one processor is further configured to:
generate, based on a plurality of pieces of the CG data, a plurality of virtual space images, wherein
the plurality of virtual space images corresponds to a plurality of imaging ranges of a plurality of real cameras that is on the real space,
each piece of the plurality of pieces of the CG data is associated with a respective camera of the plurality of real cameras,
the plurality of real cameras includes the real camera, and
the plurality of virtual space images includes the generated virtual space image;

superimpose, on a plurality of real space images, the plurality of virtual space images, wherein
each virtual space image of the plurality of virtual space images is superimposed on a respective real space image of the plurality of real space images,
the plurality of real space images is captured by the plurality of real cameras, and
the plurality of real space images includes the real object; and
generate a plurality of display images including the display image based on the superimposition of the plurality of virtual space images on the plurality of real space images.

8. The image processing apparatus according to claim 7, wherein the at least one processor is further configured to hold the CG data.

9. The image processing apparatus according to claim 7, further comprising a plurality of processors, wherein
the plurality of processors includes the at least one processor, and
each processor of the plurality of processors is configured to:
generate a respective virtual space image of the plurality of virtual space images based on one of the CG data held by a respective processor of the plurality of processors or the CG data held by a common server; and
superimpose the respective virtual space image on the respective real space image of the plurality of real space images.

10. The image processing apparatus according to claim 1, wherein
the real camera on the real space is externally attached to the vehicle to capture a window image,
the display image is displayed on a display device that displays the window image, and
the display device is inside the vehicle.

11. An image processing method, comprising:
acquiring a real space image from a real camera, wherein
the real camera is attached to a vehicle in a real space, and
the real camera captures a real object on the real space to generate the real space image;
determining each of a position of the real camera on the real space and a direction of the real camera on the real space based on information associated with each of a position of the vehicle on the real space, an orientation of the vehicle on the real space, an attachment position of the real camera on the vehicle, and an attachment angle of the real camera on the vehicle;
installing a virtual camera on a virtual space based on each of the position of the real camera on the real space, the direction of the real camera on the real space, and an angle of view of the real camera on the real space, wherein
the virtual camera corresponds to the real camera on the real space;
imaging, by the installed virtual camera, a computer graphics (CG) object on the virtual space;
generating, based on the imaged CG object and CG data associated with the imaged CG object, a virtual space image corresponding to an imaging range of the real camera;
superimposing the virtual space image on the real space image; and
generating a display image based on the superimposition of the virtual space image on the real space image.

* * * * *